(12) United States Patent
Zhang

(10) Patent No.: US 7,823,492 B2
(45) Date of Patent: Nov. 2, 2010

(54) DUAL RATIO DRIVE FOR ROTARY SHEAR

(75) Inventor: Peiliang P. Zhang, Shrewsbury, MA (US)

(73) Assignee: Siemens Industry, Inc., Alpharetta, GA (US)

( * ) Notice: Subject to any disclaimer, the term of this patent is extended or adjusted under 35 U.S.C. 154(b) by 652 days.

(21) Appl. No.: 11/148,627

(22) Filed: Jun. 9, 2005

(65) Prior Publication Data

US 2006/0278054 A1    Dec. 14, 2006

(51) Int. Cl.
*B26D 1/40*    (2006.01)

(52) U.S. Cl. .............................. 83/311; 83/345; 83/674; 192/70.2

(58) Field of Classification Search .................... 83/303, 83/311, 343, 345, 673, 674; 192/70.2
See application file for complete search history.

(56) References Cited

U.S. PATENT DOCUMENTS

| | | | | |
|---|---|---|---|---|
| 1,967,559 A | * | 7/1934 | Schreck | 83/298 |
| 2,070,537 A | * | 2/1937 | Matthews | 83/288 |
| 2,180,203 A | * | 11/1939 | Hallden | 83/311 |
| 3,143,910 A | * | 8/1964 | Greis | 83/311 |
| 3,882,745 A | * | 5/1975 | Garrett et al. | 83/311 |
| 4,090,118 A | | 5/1978 | Smith, Jr. | |
| 4,319,505 A | | 3/1982 | Otake et al. | |
| 4,331,053 A | * | 5/1982 | Imai et al. | 83/174 |
| 4,846,033 A | | 7/1989 | Uehlinger et al. | |
| 5,526,726 A | | 6/1996 | Shore et al. | |
| 5,639,335 A | | 6/1997 | Achilles et al. | |
| 6,032,560 A | * | 3/2000 | Puchovsky | 83/304 |
| 6,164,175 A | | 12/2000 | Grenz et al. | |
| 6,349,585 B1 | | 2/2002 | Grenz et al. | |
| 6,745,656 B1 | | 6/2004 | Shen et al. | |

FOREIGN PATENT DOCUMENTS

| | | |
|---|---|---|
| DE | 2035698 | 1/1972 |
| EP | 1072333 | 1/2001 |
| WO | WO 03/022471 | 3/2003 |

* cited by examiner

*Primary Examiner*—Kenneth E. Peterson
(74) *Attorney, Agent, or Firm*—Michael J. Wallace, Jr.

(57) ABSTRACT

A dual ratio drive for a rotary sheer comprises a parallel pair of first shafts carrying freely rotatable first gears. A pair of second shafts are rotatable about axes parallel to the axes of the first shafts. Each second shaft carries a shear blade, and a second gear in meshed relationship with one of the first gears. A drive shaft is connectable to one of the second shafts by a first gear set having a high speed ratio, and is connectable to one of the first shafts by a second gear set having a low speed ratio. A clutch alternately engages one or the other of the first and second gear sets to drive the second shafts and their respective shear blades at the different speeds.

8 Claims, 3 Drawing Sheets

DUAL RATIO DRIVE FOR ROTARY SHEAR

BACKGROUND OF THE INVENTION

1. Field of the Invention

This invention relates generally to shears employed to subdivide hot rolled steel bar products in rolling mills, and is concerned in particular with the provision of a dual ratio drive for such shears.

2. Description of the Prior Art

Smaller sized bar products ranging in diameter up to about 16 mm are typically delivered to dividing shears at speeds ranging as high as 20 m/sec, whereas larger bar products having diameters larger than 60 mm travel at substantially lower speeds, often as low as 1.5 m/sec. Conventionally, the smaller sized bar products are subdivided by high speed shears, having sufficient kinetic energy to propel the shear blades through successive cutting cycles. However, because of their lower delivery speeds and larger cross sections, the larger sized bar products must be directed to shears operating at lower speeds, where flywheels or the like are needed to develop the energy required to effect cutting.

The objective of present invention is to provide a dual ratio drive enabling one shear to subdivide both the smaller and larger sized bar products.

SUMMARY OF THE INVENTION

A dual ratio drive in accordance with the present invention comprises a parallel pair of first shafts carrying freely rotatable first gears. A pair of second shafts are rotatable about axes parallel to the axes of the first shafts. Each second shaft carries a shear blade and a second gear in meshed relationship with one of the first gears. A drive shaft is connectable to one of the second shafts by a first gear set having a high speed ratio, and is connectable to one of the first shafts by a second gear set having a low speed ratio. A clutch alternately engages one or the other of the first and second gear sets to drive the second shafts at the different speeds.

These and other features and attendant advantages of the present invention will now be described in greater detail with reference to the accompanying drawings, wherein:

DETAILED DESCRIPTION

Figure 1:
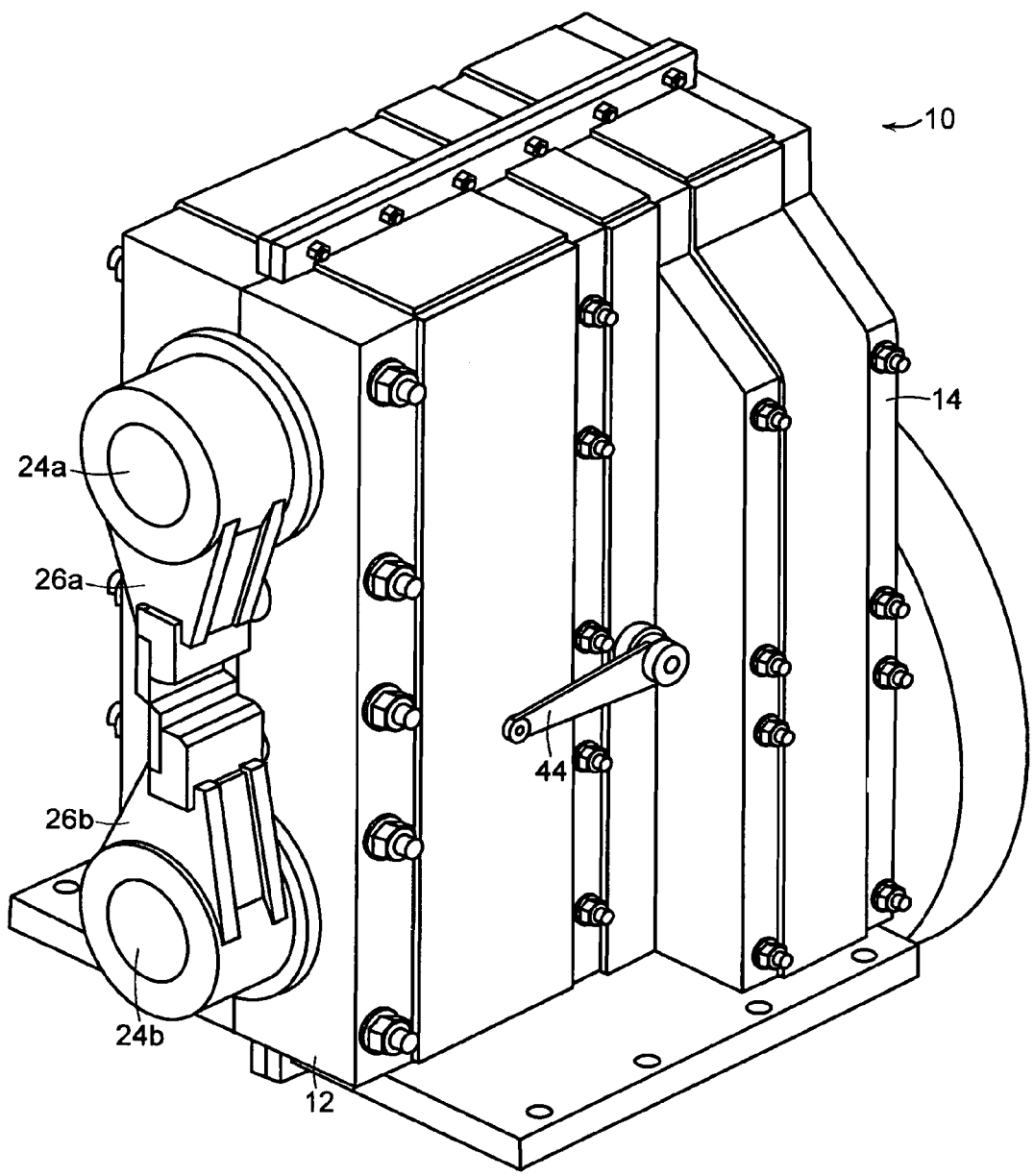
FIG. 1 is a perspective view of a shear incorporating a dual ratio drive in accordance with the present invention.
Figure 2:
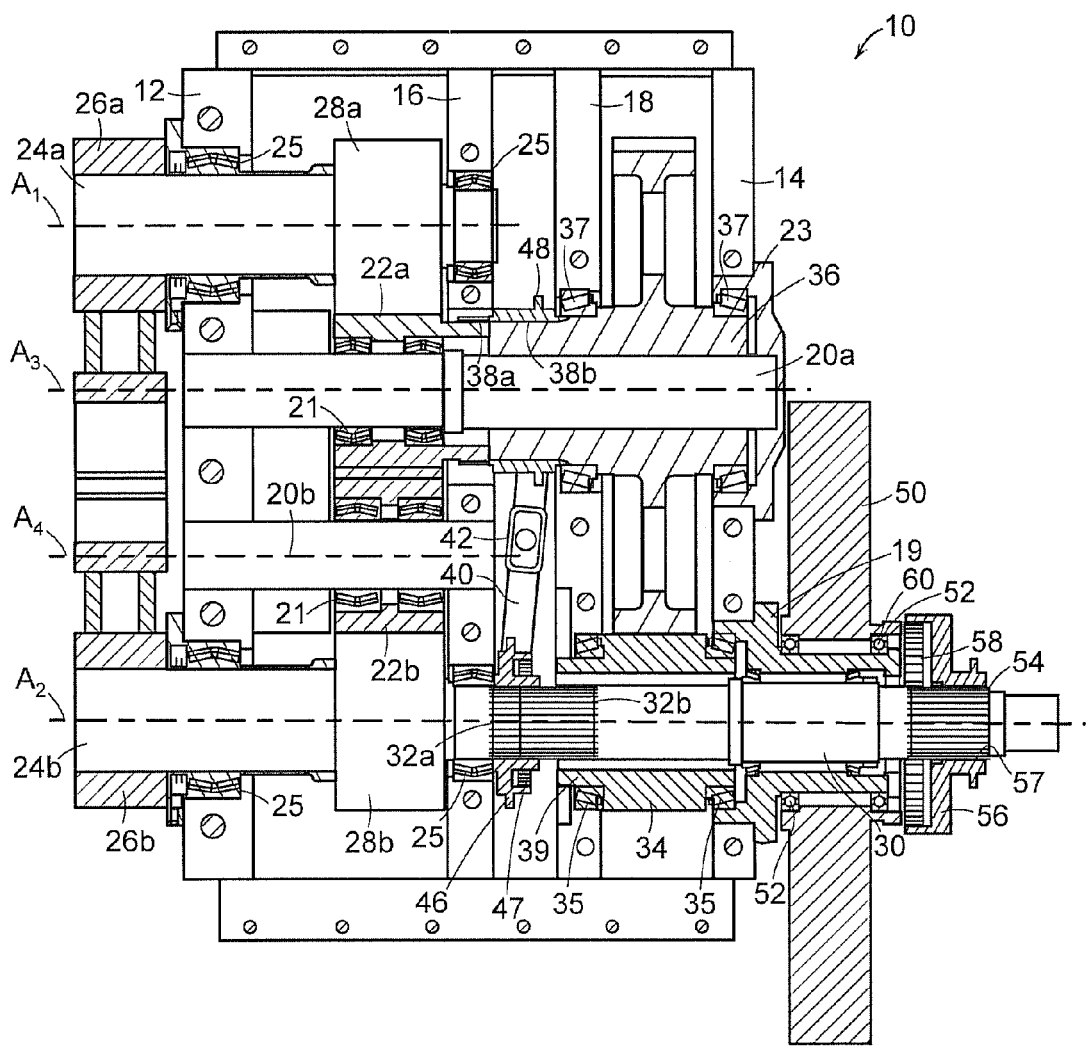
FIG. 2 is a vertical sectional view taken through the shear of FIG. 1, and showing the dual ratio drive in a high speed mode.

With reference initially to FIGS. 1 and 2, a shear incorporating a dual ratio drive in accordance with the present invention is generally depicted at 10. The shear includes a housing structure having front and rear walls 12, 14 and internal partitions 16, 18.

A parallel pair of non-rotatable first shafts 20a, 20b is contained within the housing. Shaft 20a extends between the front and rear housing walls 12, 14, whereas shaft 20b is shorter and extends between the front wall 12 and the intermediate partition 16. Intermeshed first gears 22a, 22b are rotatably mounted, respectively, on the first and second shafts 20a, 20b by bearings 21.

A pair of second shafts 24a, 24b are mounted by means of bearings 25 supported on the front wall 12 and intermediate partition 16 for rotation about axes $A_1$, $A_2$ parallel to the axes $A_3$, $A_4$ of the first shafts 20a, 20b. Each of the second shafts has fixed thereto a respective shear blade 26a, 26b and a second gear 28a, 28b. The second gears 28a, 28b are in meshed relationship with respective first gears 22a, 22b.

A drive shaft 30 is aligned coaxially with the second shaft 24b.

A first gear set having a high speed ratio comprises adjacent first externally splined ends 32a, 32b respectively on second shaft 24b and the drive shaft 30.

A second gear set having a low speed ratio comprises a third gear 34 surrounding the drive shaft 30 and supported by bearings 35 carried by partition 18 and a collar 19 in the rear wall 14. Gear 34 is in meshed relationship with a fourth gear 36 supported by bearings 37 carried by partition 18 and an end cap 23 in the rear wall 14. Gear 36 is freely rotatable about the axis $A_3$ of shaft 20a, and gear 34 is freely rotatable about the axis $A_2$ of drive shaft 30. Gears 22a and 36 have adjacent second externally splined ends 38a, 38b, and gear 34 has a third externally splined end 39.

Figure 3:
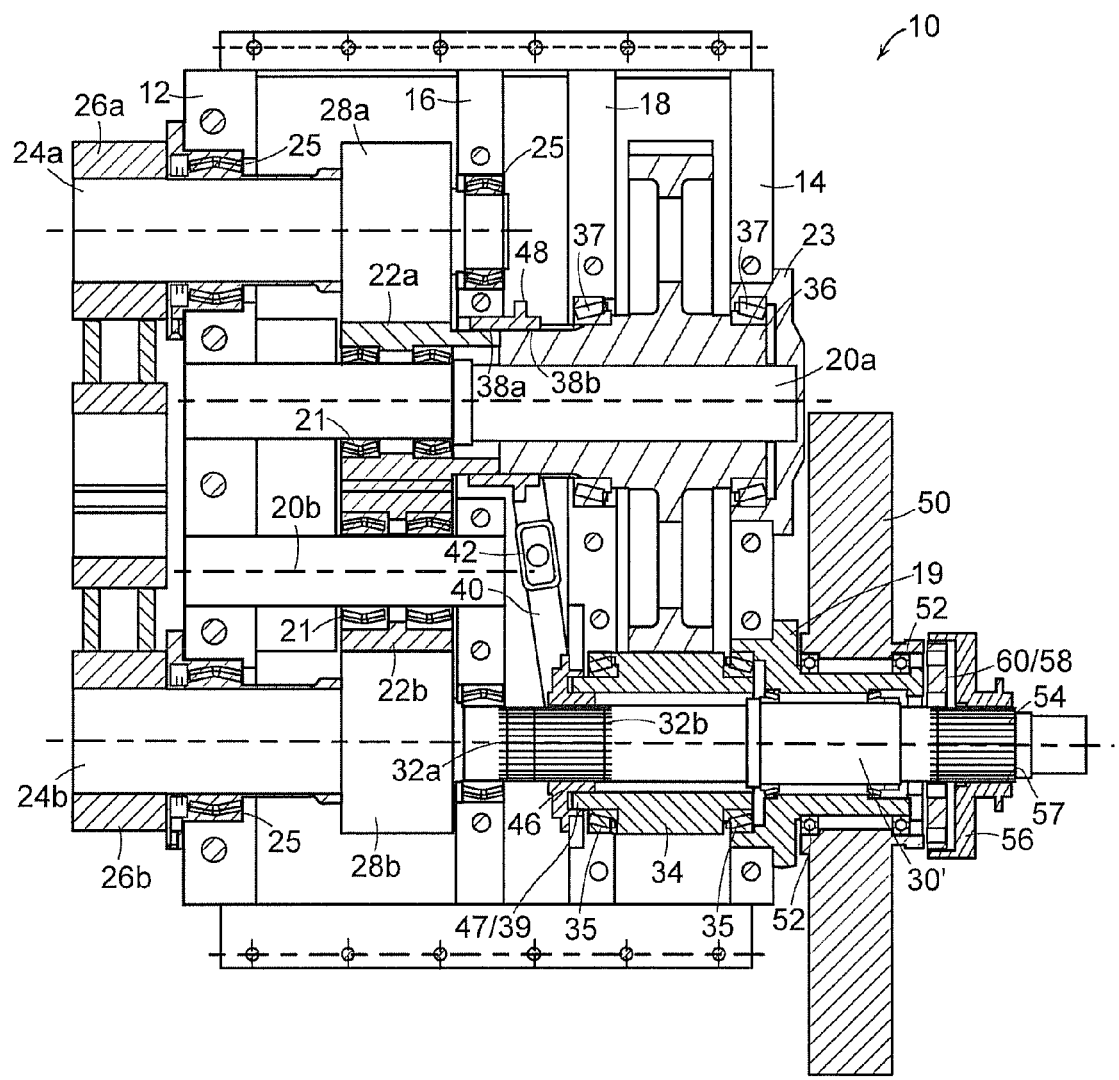
FIG. 3 is a view similar to FIG. 2 showing the dual ratio drive in a low speed mode.

A clutch comprises a lever 40 fixed to a cross shaft 42 having an external arm 44 (see FIG. 1). Lever 40 carries freely rotatable internally splined first and second coupling members fifth and sixth gears 46, 48. First coupling member 46 is additionally provided with an outer collar containing a third coupling member ring gear 47. Lever 40 is adjustable between a high speed mode as shown in FIG. 2, and a low speed mode as shown in FIG. 3.

In the high speed mode, first coupling member 46 is internally meshed with both of the first externally splined ends 32a, 32b to thereby mechanically couple drive shaft 30 to the second shaft 24b, whereas second coupling member 48 is out of engagement with at least one of the second externally splined ends 38a, 38b. In the low speed mode, the opposite condition exists, i.e., first coupling member 46 is out of engagement with externally splined end 32a, is internally meshed with externally splined end 32b, and its coupling member 47 is engaged with the third externally splined end 39 of gear 34. Second coupling member 48 is in meshed relationship with both of the externally splined ends 38a, 38b to thereby mechanically couple the drive shaft 30 via gears 34 and 36 to the first gear 22a. The lever 40 is alternately adjustable between the high and low speed modes by rotating the external arm 44.

A flywheel 50 is supported by bearings 52 on the collar 19 for free rotation about the axis of drive shaft 30. The drive shaft has a second externally splined end 54. An axially shiftable clutch collar 56 has a first internal coupling member 57 in meshed relationship with the splined drive shaft end 54, and a second internal coupling member 58 arranged to coact with an external coupling member 60 on the flywheel to selectively fix the fly wheel 50 to the drive shaft when circumstances require additional momentum, as dictated by product speed and the required cutting energy.

The above-described alternately adjustable dual ratio drive allows the shear to service a wider range of products, thus resulting in simpler mill layouts and important savings in capital costs.

Various changes and modifications can be made to the above-described embodiment without departing from the scope of the appended claims. A non-limiting example of one such modification would be the substitution of a functionally equivalent electrically or hydraulically actuated clutching arrangement for alternately engaging the dual ratio gear sets.

What is claimed is:

1. A rotary dividing shear comprising:
a pair of shearing blades;
a dual ratio drive comprising;
  a parallel pair of first shafts;
  intermeshed first gears respectively rotatably mounted on said first shafts;
  a pair of second shafts rotatable about axes parallel to the axes of said first shafts, each of said second shafts having fixed thereto one of said pair of shearing blades, and a second gear in meshed relationship with a respective one of said first gears;
  a drive shaft arranged coaxially with one of said second shafts;
  intermeshed third and fourth gears respectively arranged coaxially with and rotatable relative to said drive shaft and one of said first gears; and
  clutch means operable in first and second modes to drive said second shafts at respective different first and second speeds,
  wherein the first mode causes a first internally splined coupling member to shift to a position that rotationally locks the drive shaft and said one of said second shafts,
  wherein the second mode causes a second internally splined member to shift to a position that rotationally locks the fourth gear and said one of said first gears.

2. The dual ratio drive of claim 1 wherein said second speed is lower than said first speed.

3. The rotary dividing shear of claim 1 wherein said drive shaft and the said one of said second shafts have adjacent first externally splined ends to mate with said first internally splined coupling member.

4. The rotary dividing shear of claim 1 or 2 wherein said fourth gear and the said one of said first gears have adjacent second externally splined ends, to mate with said second internally splined coupling member.

5. The rotary dividing shear of claim 4 wherein said third gear has a third externally splined end, and wherein said second mode is achieved in part by mechanically coupling the first externally splined end on said drive shaft to said third externally splined end.

6. The rotary dividing shear of claim 5 wherein said clutch means comprises a lever carrying said internally splined first and second coupling members, and means for adjusting said lever between said first mode in which said first coupling member is in meshed relationship with both of said first externally splined ends and said second coupling member is out of mesh with at least one of said second externally splined ends, and said second mode in which said first coupling member is in meshed relationship with the first externally splined end on said drive shaft and the third externally splined end on said third gear, and said second coupling member is in meshed relationship with both of said second externally splined ends.

7. The rotary dividing shear of claim 6 wherein the first operational mode of said clutch means results in said second shafts being driven at a rotational speed higher than the rotational speed of said second shafts when said clutch means is in said second operational mode.

8. The rotary dividing shear of claim 1 further comprising a fly wheel rotatably mounted on said drive shaft, and second clutch means for selectively rotatably fixing said fly wheel to said drive shaft.

* * * * *